United States Patent
Hikai et al.

(10) Patent No.: US 7,797,902 B2
(45) Date of Patent: Sep. 21, 2010

(54) BACKING METAL FIXTURE AND EXTERNAL WALL CONSTRUCTING STRUCTURE USING THE SAME

(75) Inventors: Satoshi Hikai, Nagoya (JP); Shin Takami, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 265 days.

(21) Appl. No.: 11/902,505

(22) Filed: Sep. 21, 2007

(65) Prior Publication Data
US 2008/0222992 A1 Sep. 18, 2008

(30) Foreign Application Priority Data
Mar. 15, 2007 (JP) .............................. 2007-066158

(51) Int. Cl.
*E04B 2/00* (2006.01)

(52) U.S. Cl. ..................... 52/506.05; 52/489.1; 52/520; 52/700

(58) Field of Classification Search .................. 52/520, 52/546, 547, 521, 506.05, 489.1, 489.2, 483.1, 52/474, 698, 702, 703, 712, 478, 700; 403/388; 411/461, 462
See application file for complete search history.

(56) References Cited

U.S. PATENT DOCUMENTS

| | | | | |
|---|---|---|---|---|
| 1,557,616 A * | 10/1925 | Riley | .............................. | 52/547 |
| 1,931,909 A * | 10/1933 | Venzie | ........................ | 403/387 |
| 2,035,389 A * | 3/1936 | Knutson | .................... | 52/506.05 |
| 2,591,361 A * | 4/1952 | Knott | ......................... | 52/489.1 |
| 2,831,222 A * | 4/1958 | Anderson | ................... | 52/489.1 |
| 3,187,389 A * | 6/1965 | Anderson | ................... | 52/489.1 |
| 3,388,518 A * | 6/1968 | Scott | .............................. | 52/478 |
| 3,812,817 A * | 5/1974 | Hallock, Jr. | .................. | 73/831 |
| 4,107,887 A * | 8/1978 | Wendt | ........................... | 52/105 |
| 4,117,644 A * | 10/1978 | Weinar | ........................ | 52/714 |
| 4,333,286 A * | 6/1982 | Weinar | ........................ | 52/281 |
| 4,377,060 A * | 3/1983 | Ragland | .................... | 52/489.2 |
| 4,866,904 A * | 9/1989 | Paul | ............................. | 52/715 |
| 4,976,083 A * | 12/1990 | Menchetti | ................... | 52/489.1 |
| 5,058,355 A * | 10/1991 | Menchetti et al. | .......... | 52/489.1 |
| 5,408,796 A * | 4/1995 | Hashimoto et al. | ......... | 52/489.2 |
| 5,966,893 A * | 10/1999 | Quillin | ........................ | 52/713 |
| 6,279,286 B1 * | 8/2001 | Ichihashi | ................... | 52/489.1 |
| 6,315,489 B1 * | 11/2001 | Watanabe | ................... | 403/381 |

(Continued)

FOREIGN PATENT DOCUMENTS

JP 2007-46345 A 2/2007

*Primary Examiner*—Richard E Chilcot, Jr.
*Assistant Examiner*—James Ference
(74) *Attorney, Agent, or Firm*—Birch, Stewart, Kolasch & Birch, LLP

(57) ABSTRACT

The present invention provides a backing metal fixture which is excellent in constructability and stability with fixing an external wall, and an external wall constructing structure using the backing metal fixture. A backing metal fixture used for fixing an external wall to a skeleton via a securing metal fitting and a heat insulating material placed on a front surface of the skeleton, comprising: a butting flat plate portion to be butted against a rear surface of the securing metal fitting having an opening in the center area to allow a fixing member to go through, and a first leg unit and a second leg unit erected rearward from the butting flat plate portion, wherein the second leg unit is erected from a position closer to the opening than the first leg unit.

9 Claims, 14 Drawing Sheets

U.S. PATENT DOCUMENTS

| | | | |
|---|---|---|---|
| 6,499,261 B2 * | 12/2002 | Hikai | 52/235 |
| 6,505,448 B2 * | 1/2003 | Ito | 52/474 |
| 6,598,362 B2 * | 7/2003 | Hikai | 52/235 |
| 6,830,405 B2 * | 12/2004 | Watanabe | 403/14 |
| 6,880,306 B2 * | 4/2005 | Burken et al. | 52/483.1 |
| 2002/0023398 A1 * | 2/2002 | Ito | 52/220.1 |
| 2002/0032999 A1 * | 3/2002 | Ito | 52/474 |
| 2002/0050111 A1 * | 5/2002 | Hikai | 52/546 |
| 2005/0102944 A1 * | 5/2005 | Hikai | 52/511 |

* cited by examiner

BACKING METAL FIXTURE AND EXTERNAL WALL CONSTRUCTING STRUCTURE USING THE SAME

BACKGROUND OF THE INVENTION

1. Field of Technology

The present invention relates to a backing metal fixture and an external wall constructing structure using the backing metal fixture. The fixing base unit used for fixing an external wall to an external wall substrate comprises a skeleton and a heat insulating material such as a plastic foam fixed to the skeleton.

2. Description of the Related Arts

A constructing structure shown in FIG. 13 and FIG. 14 has been known as shown in JP2007-046345A. FIG. 13 and FIG. 14 show an external wall constructing structure 1 with external heat insulation where an insulating material 3 made of plastic foam is fixed to a front surface 21 of a skeleton 2, a backing metal fixture 6 is pressed into the insulating material 3 so that a front surface of the backing metal fixture 6 and a front surface 31 of the insulating material 3 are almost aligned, and then a securing metal fitting 4 with a rear surface 41 is butted against the front surface of the backing metal fixture 6, then finally an external wall 5 is secured/fixed to the skeleton 2 with the securing metal fitting 4 and a screw 11.

As shown in FIG. 12, however, it often happens that the screw 11 is screwed in excessively when the securing metal fitting 4 is secured to the skeleton 2, which may cause a buckling to provide a local deformation to a butting flat plate portion 61 of the backing metal fixture 6 and/or a leg 62 butting against the skeleton 2 after pressed in the insulating material 3. This likely leads to an unevenness in terms of a relative positional relationship between many of the mounted butting flat plate portions 61 of backing metal fixtures 6 and results in an uneven surface of the external wall 5.

SUMMARY OF THE INVENTION

An object of the present invention is to resolve the above problem by providing a backing metal fixture, which is hard to be deformed, does not cause unevenness and is excellent in constructability and stability with regard to fixing an external wall, and an external wall constructing structure using the backing metal fixture.

The above object can be accomplished by the following inventive embodiments of a backing metal fixture.

First Embodiment

A backing metal fixture used for fixing an external wall to a skeleton via a securing metal fitting and a heat insulating material placed on a front surface of the skeleton, comprising:

a butting flat plate portion to be butted against a rear surface of the securing metal fitting having an opening in the center area to allow a fixing member to go through, and a first leg unit and a second leg unit erected rearward from the butting flat plate portion, wherein the second leg unit is erected from a position closer to the opening.

Second Embodiment

A backing metal fixture according to the first embodiment of the invention, wherein the first leg unit and second leg unit have the same length and are tapered in width toward the free end.

Third Embodiment

A backing metal fixture according to the first embodiment, wherein the second leg unit is made of three legs and each of the three legs is positioned so that each of the outer surfaces of the three legs is erected from each of 3 lines of two hypotenuses and a bottom of an isosceles triangle respectively. The object of the present invention can be more effectively accomplished by this third embodiment of the invention.

Fourth Embodiment

A backing metal fixture according to the first invention, wherein the first leg unit is made of two legs, the two legs are erected respectively from right and left downwardly extended parts of the front flat butting surface (plate) portion which locate away laterally from the leg of the second leg unit positioned corresponding to the bottom of the isosceles triangle. The object of the present invention can be furthermore effectively accomplished by this fourth embodiment of the invention.

Fifth Embodiment

A backing metal fixture according to the first embodiment of the invention, wherein the first leg unit and the second leg unit have the same length, the second leg unit is a tubular leg fixed to the rear surface of the butting flat plate portion and has a plurality of cutouts so that the width of curved surface portion can be tapered toward the free end of the tubular leg. The object of the present invention can be furthermore effectively accomplished by this fifth embodiment of the invention.

Sixth Embodiment

An external wall constructing structure where an external wall is fixed to a skeleton via a securing metal fitting and a heat insulating material placed on a front surface of the skeleton, comprising:

a backing metal fixture set in the heat insulating material against which a rear surface of the securing metal fitting is butted, wherein the backing metal fixture comprises:

a butting flat plate portion to be butted against a rear surface of the securing metal fitting having an opening in the center area to allow a fixing member to go through, and a first leg unit and a second leg unit erected rearward from the butting flat plate portion, wherein the second leg unit is erected from a position closer to the opening.

Seventh Embodiment

An external wall constructing structure according to the sixth embodiment of the invention, wherein the first leg unit and the second leg unit have the same length and are tapered in width toward the free end.

Eighth Embodiment

An external wall constructing structure according to the sixth embodiment of the invention, wherein the second leg unit is made of three legs and each of the three legs is positioned so that each of the outer surfaces of the three legs is erected from each of 3 lines of two hypotenuses and a bottom of an isosceles triangle, respectively. The object of the present invention can be more effectively accomplished by this eighth embodiment of the invention.

Ninth Embodiment

An external wall constructing structure according to the eighth embodiment of the invention, wherein the first leg unit is made of two legs, the two legs are erected respectively from right and left downwardly extended parts of the butting flat plate portion, which locate away laterally from the leg of a second leg unit positioned corresponding to the bottom of an isosceles triangle. The object of the present invention can be furthermore effectively accomplished by this ninth embodiment of the invention.

Tenth Embodiment

An external wall constructing structure according to the sixth embodiment of the invention, wherein the first leg unit and the second leg unit have the same length, the second leg unit is a tubular leg fixed to rear surface of the butting flat plate portion and has a plurality of cutouts so that the width of a curved surface portion can be tapered toward the free end of the tubular leg. The object of the present invention can be furthermore effectively accomplished by this tenth embodiment of the invention.

Eleventh Embodiment

An external wall constructing structure according to the sixth to tenth embodiments of the invention, wherein the first leg unit is positioned so that the first leg unit and a top end part of a lower tongue portion of a lower external wall panel at a joint region of upper and lower external wall panels are in roughly the same horizontal plane.

According to the backing metal fixture and the external wall constructing structure of the present invention, the backing metal fixture is prevented from deformation when a securing metal fitting disposed on a butting flat plate portion is fixed to a skeleton (building framework) with a screw, since the backing metal fixture has a reinforcing second leg type near the opening erected rearward from the butting flat plate portion. That is, a pressure applied to the backing metal fixture from screwing the screw can be allocated not only to the first leg unit but also to the reinforcing second leg unit, which can prevent the legs and/or butting flat plate portion from deformation. This likely leads to preventing an unevenness in terms of relative positional relationship between many of the being-used butting flat plate portions of the backing metal fixtures and results in preventing an uneven surface of the external wall to be produced by the securing of the metal fitting. Consequently a securing of the external wall can be stabilized.

DETAILED DESCRIPTION OF THE INVENTION

Figure 3:
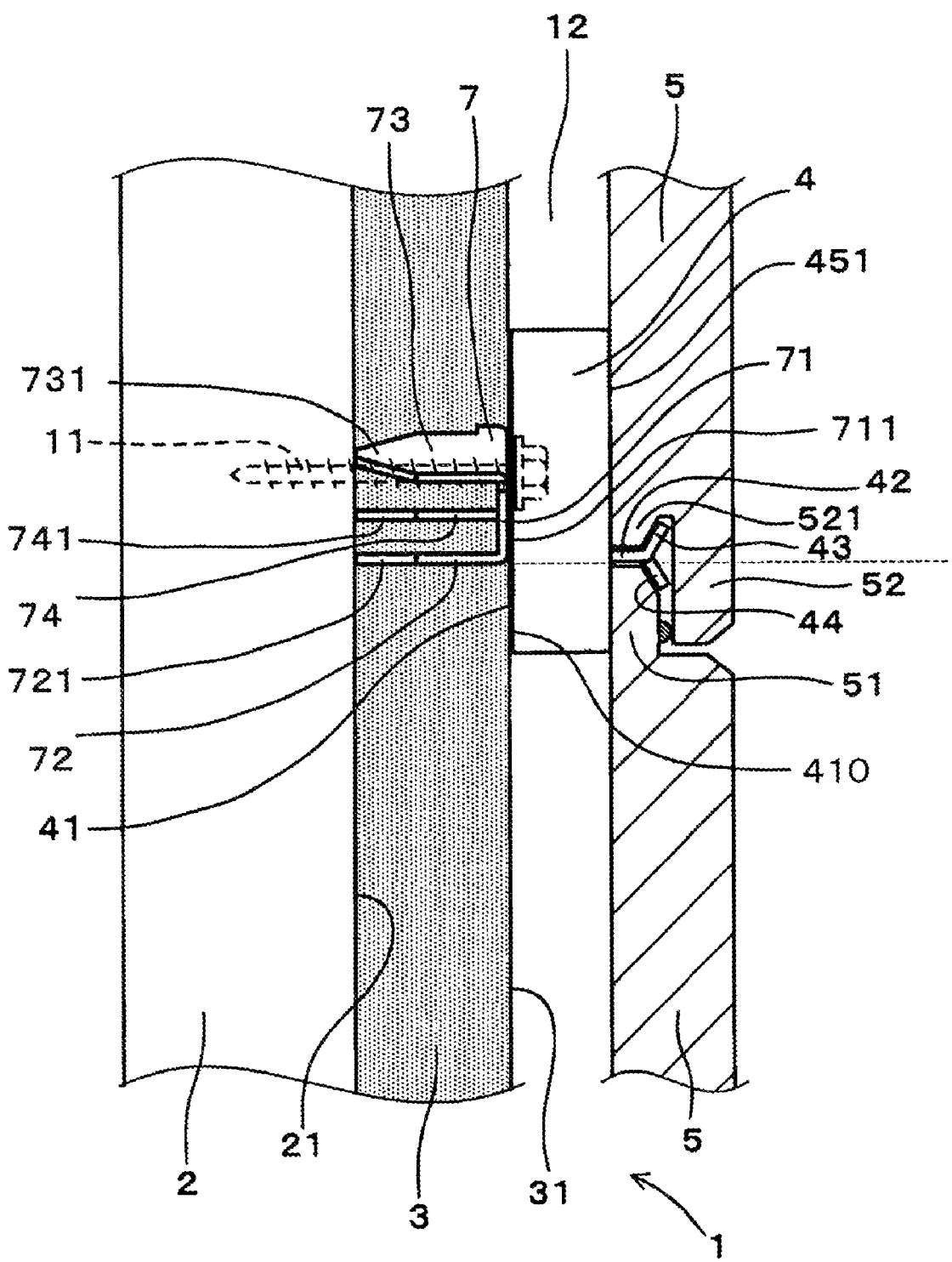
FIG. 3 is a vertical sectional view of an external wall constructing structure of example 1.
Figure 4:
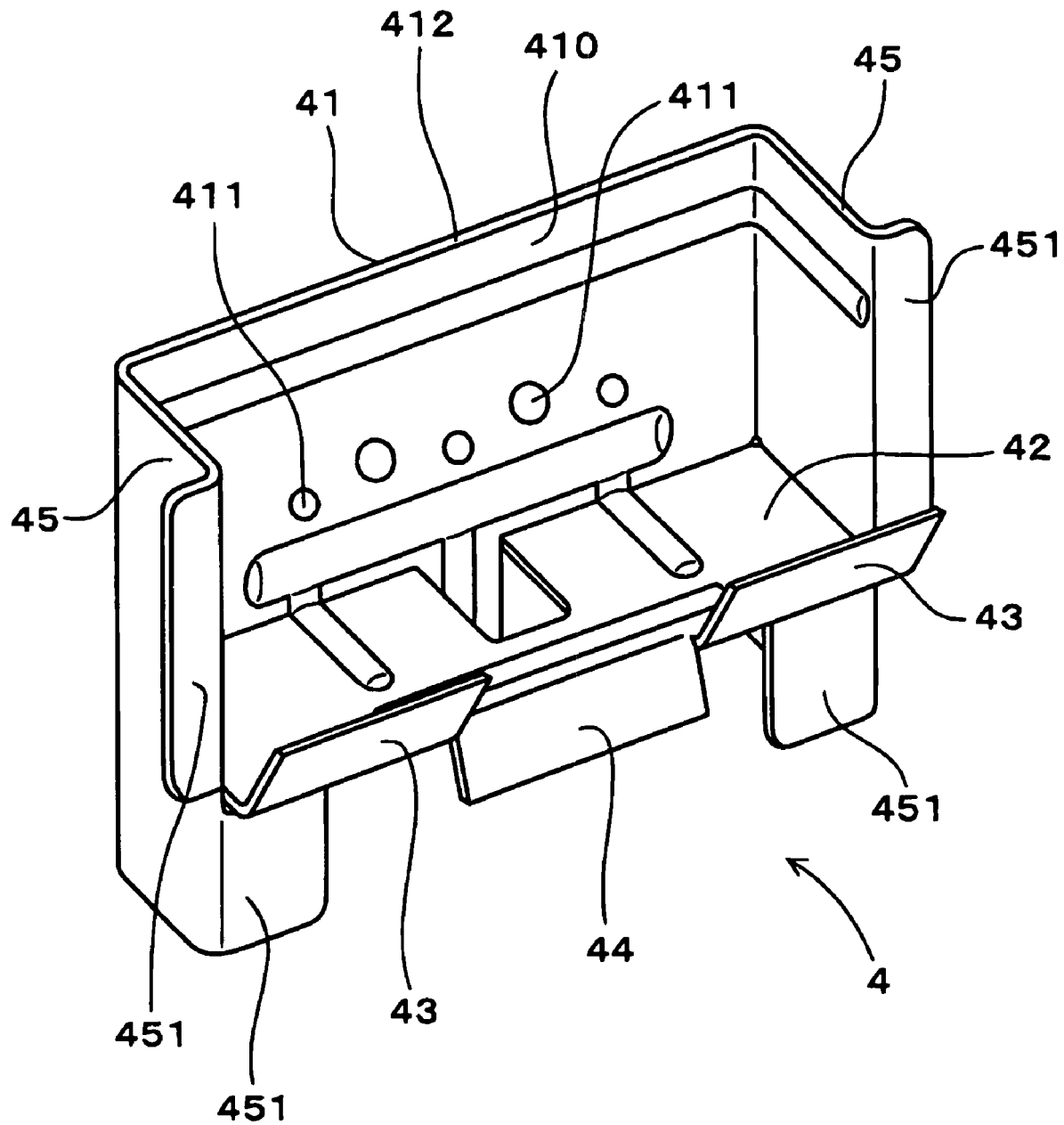
FIG. 4 is a perspective view of a securing metal fitting of example 1.
Figure 5C:
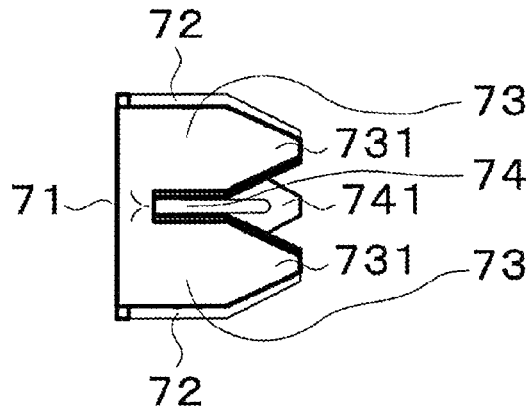
FIG. 5 shows a modified example 1 based on a backing metal fixture of example 1 where FIG. 5(*a*), FIG. 5(*b*), FIG. 5(*c*), FIG. 5(*d*) and FIG. 5(*e*) show respectively a front view, a right side view, a top plan view, a bottom plan view and a rear view thereof.
Figure 5A:
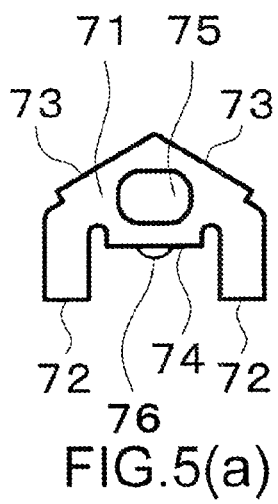
Figure 5B:
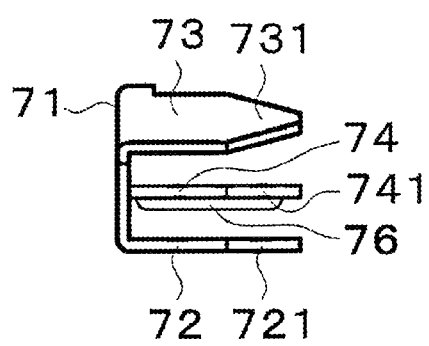
Figure 5E:
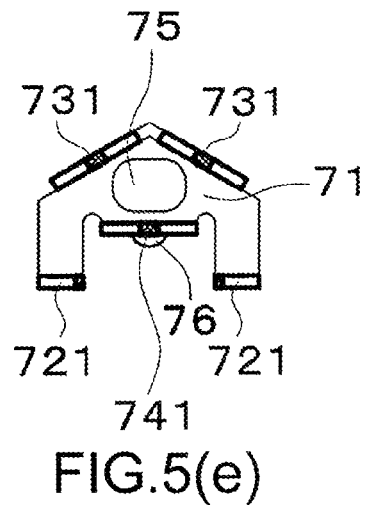
Figure 5D:
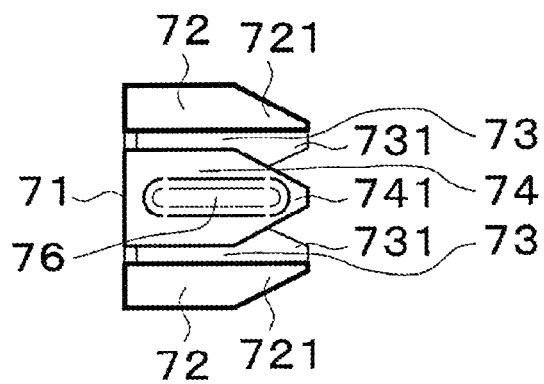
Figure 6C:
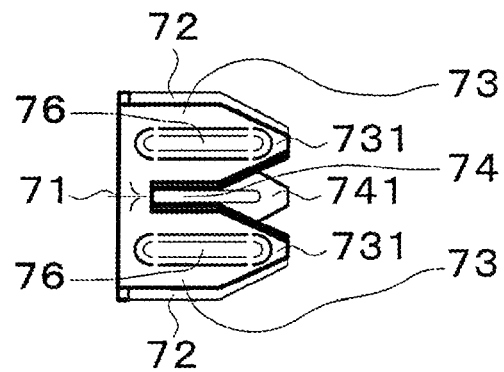
FIG. 6 shows a modified example 2 based on a backing metal fixture of example 1 where FIG. 6(*a*), FIG. 6(*b*), FIG. 6(*c*), FIG. 6(*d*) and FIG. 6(*e*) show respectively a front view, a right side view, a top plan view, a bottom plan view and a rear view thereof.
Figure 6A:
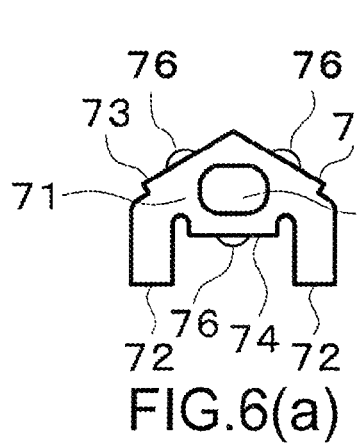
Figure 6B:
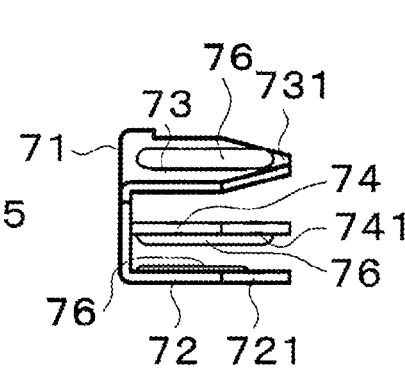
Figure 6E:
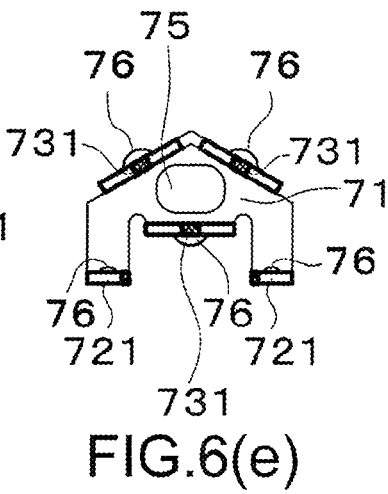
Figure 6D:
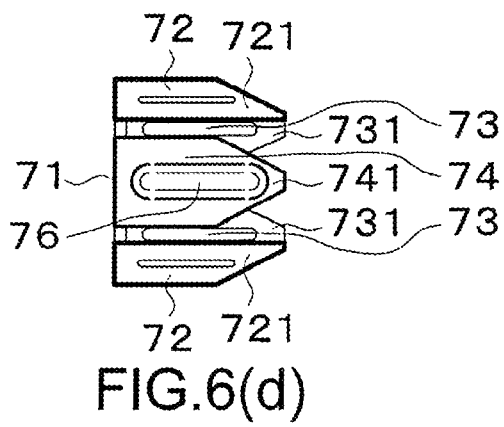
Figure 7C:
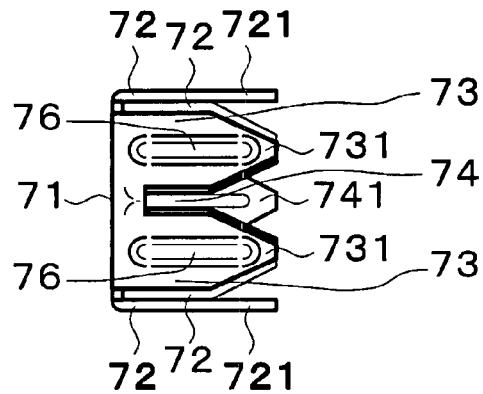
FIG. 7 shows a modified example 3 based on a backing metal fixture of example 1 where FIG. 7(*a*), FIG. 7(*b*), FIG. 7(*c*), FIG. 7(*d*) and FIG. 7(*e*) show respectively a front view, a right side view, a top plan view, a bottom plan view and a rear view thereof.
Figure 7A:
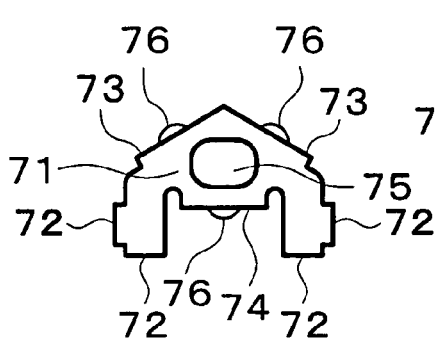
Figure 7B:
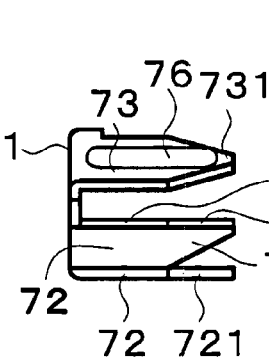
Figure 7E:
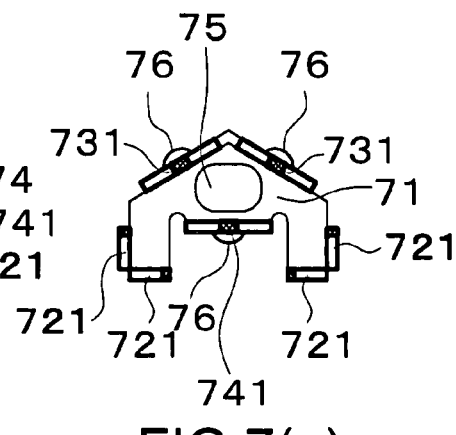
Figure 7D:
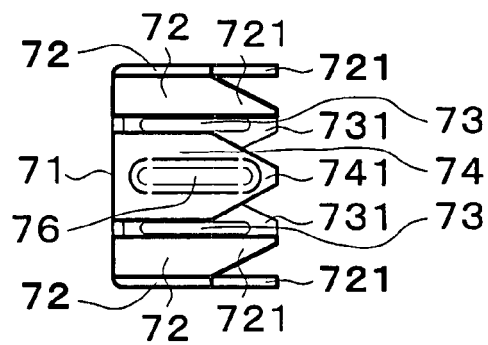
Figure 8C:
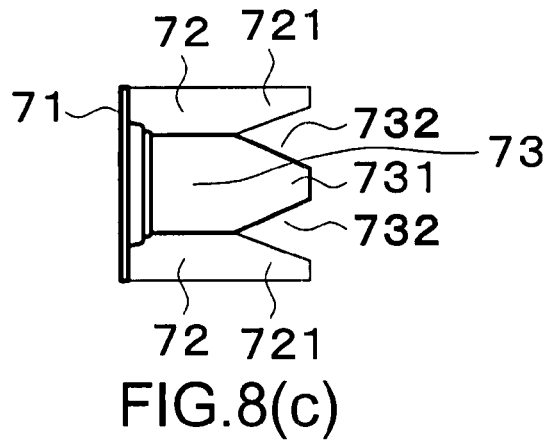
FIG. 8 shows a backing metal fixture of example 2 where FIG. 8(*a*), FIG. 8(*b*), FIG. 8(*c*), FIG. 8(*d*) and FIG. 8(*e*) show respectively a front view, a right side view, a top plan view, a bottom plan view and a rear view thereof.
Figure 8A:
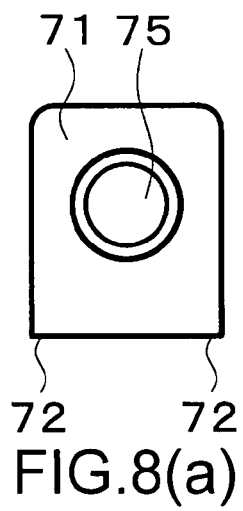
Figure 8B:
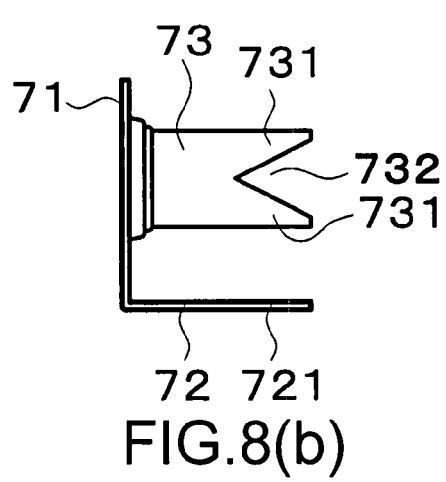
Figure 8E:
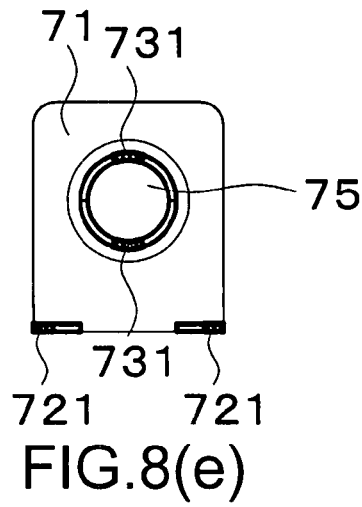
Figure 8D:
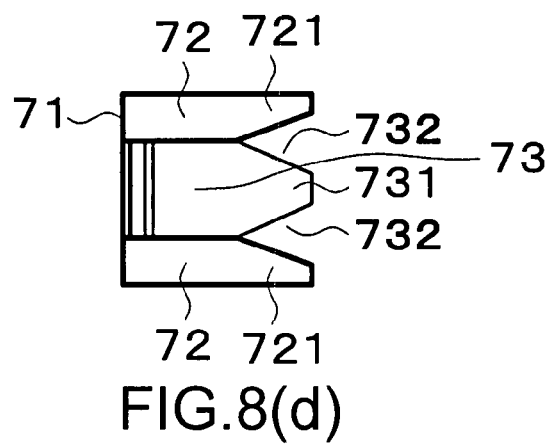
Figure 9C:
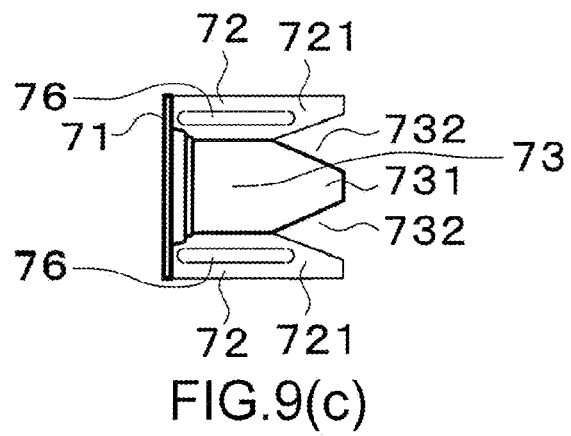
FIG. 9 shows a modified example 4 based on a backing metal fixture of example 2 where FIG. 9(*a*), FIG. 9(*b*), FIG. 9(*c*), FIG. 9(*d*) and FIG. 9(*e*) show respectively a front view, a right side view, a top plan view, a bottom plan view and a rear view thereof.
Figure 9A:
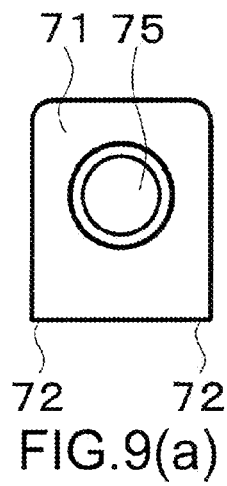
Figure 9B:
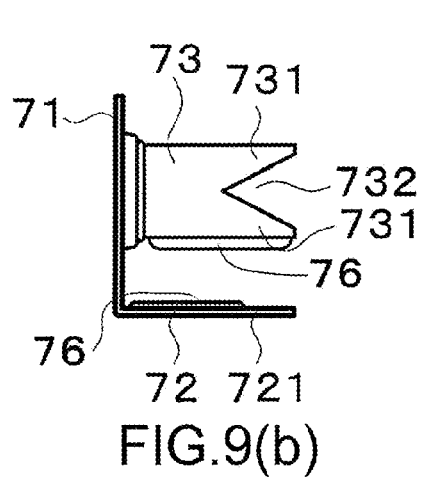
Figure 9E:
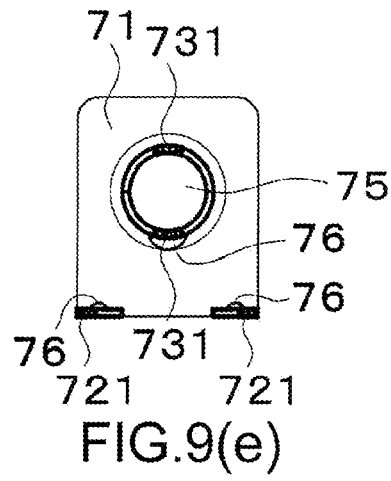
Figure 9D:
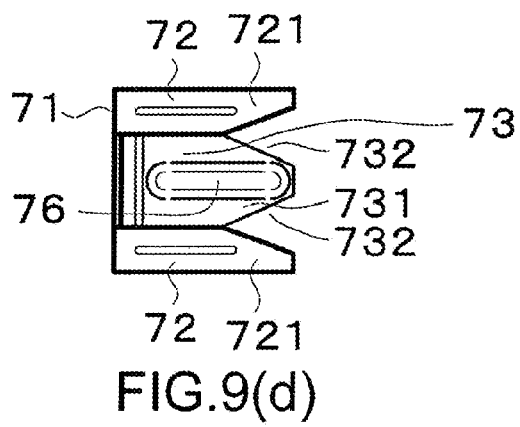
Figure 10C:
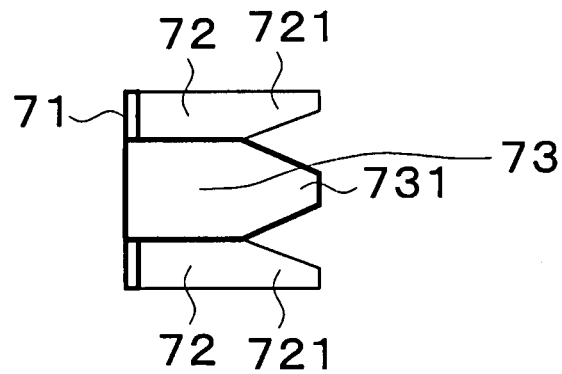
FIG. 10 shows a backing metal fixture of example 3 where FIG. 10(*a*), FIG. 10(*b*), FIG. 10(*c*), FIG. 10(*d*) and FIG. 10(*e*) show respectively a front view, a right side view, a top plan view, a bottom plan view and a rear view thereof.
Figure 10A:
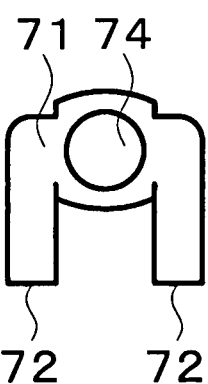
Figure 10B:
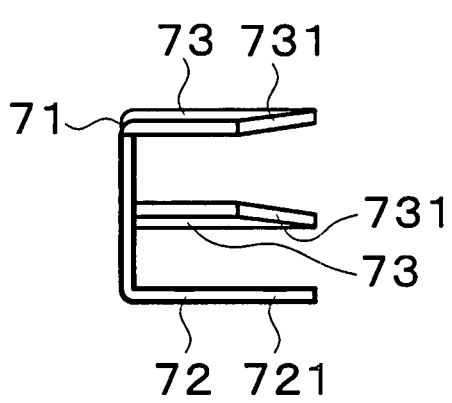
Figure 10E:
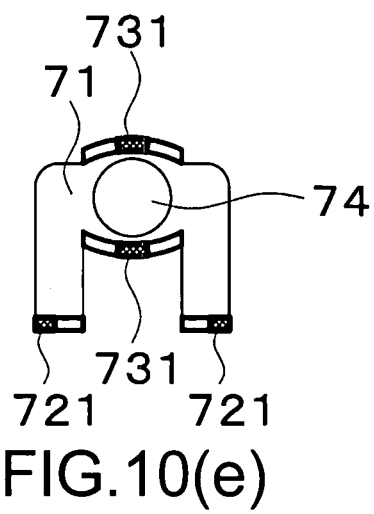
Figure 10D:
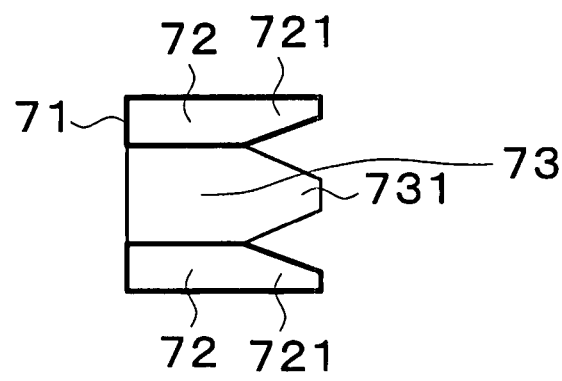
Figure 11C:
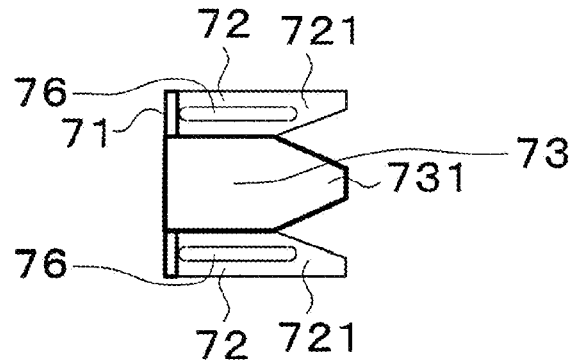
FIG. 11 shows a modified example 5 based on a backing metal fixture of example 3 where FIG. 11(*a*), FIG. 11(*b*), FIG. 11(*c*), FIG. 11(*d*) and FIG. 11(*e*) show respectively a front view, a right side view, a top plan view, a bottom plan view and a rear view thereof.
Figure 11A:
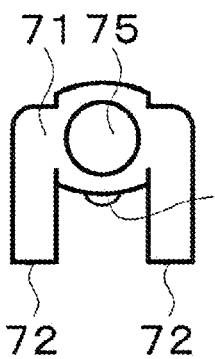
Figure 11B:
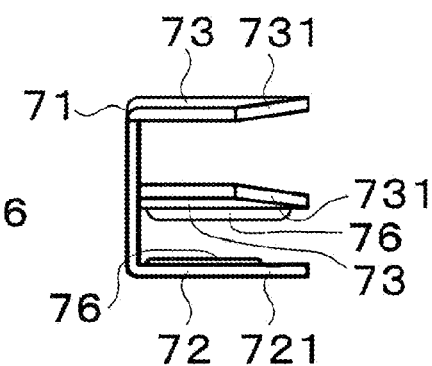
Figure 11E:
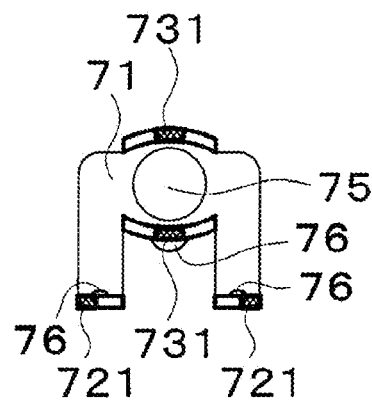
Figure 11D:
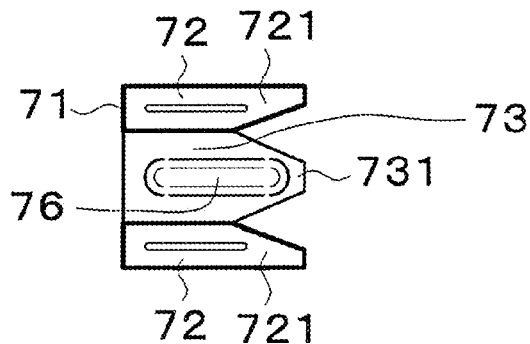
Figure 12:
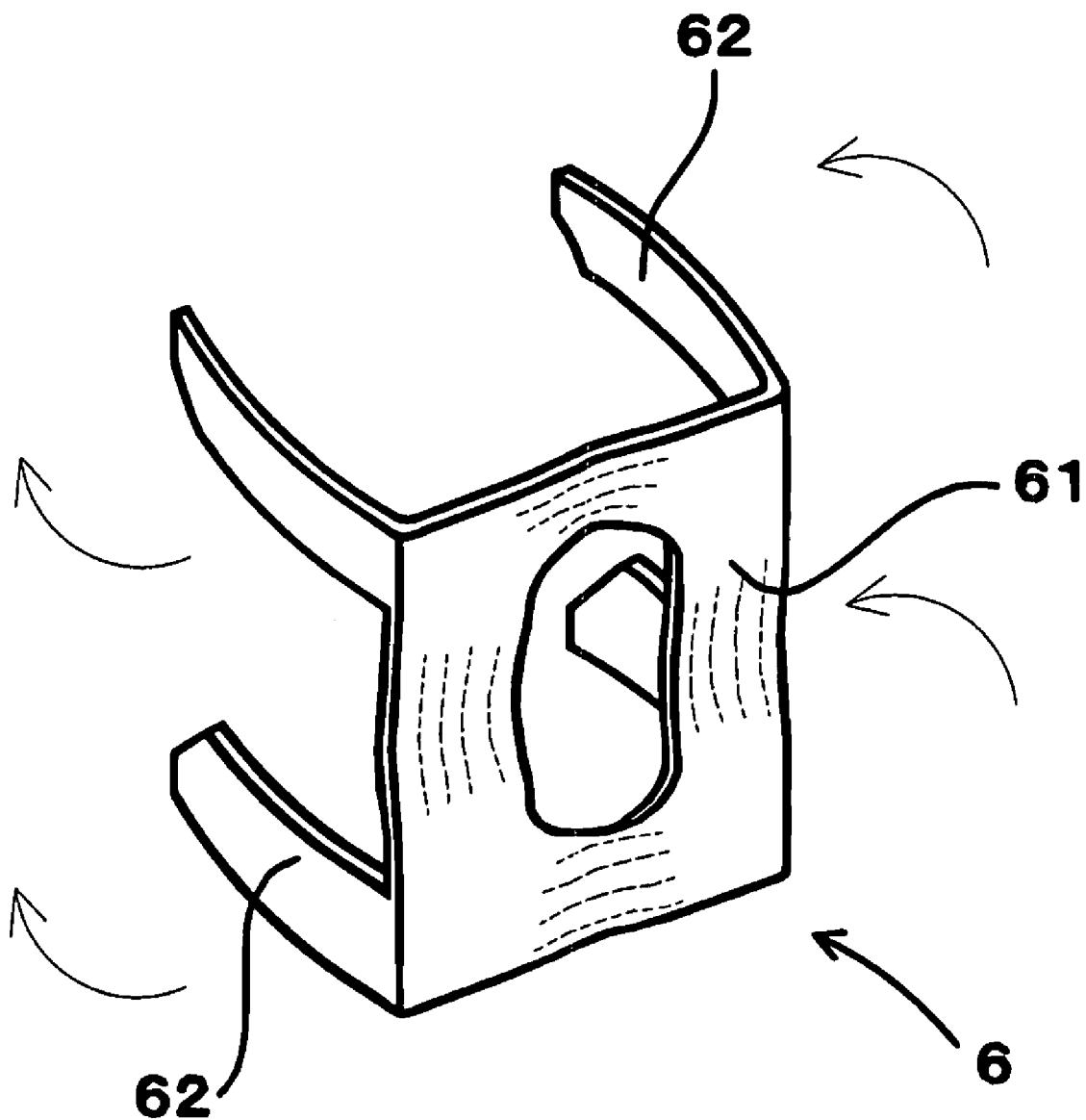
FIG. 12 is a perspective view of a conventional backing metal fixture having a local deformation.
Figure 13:
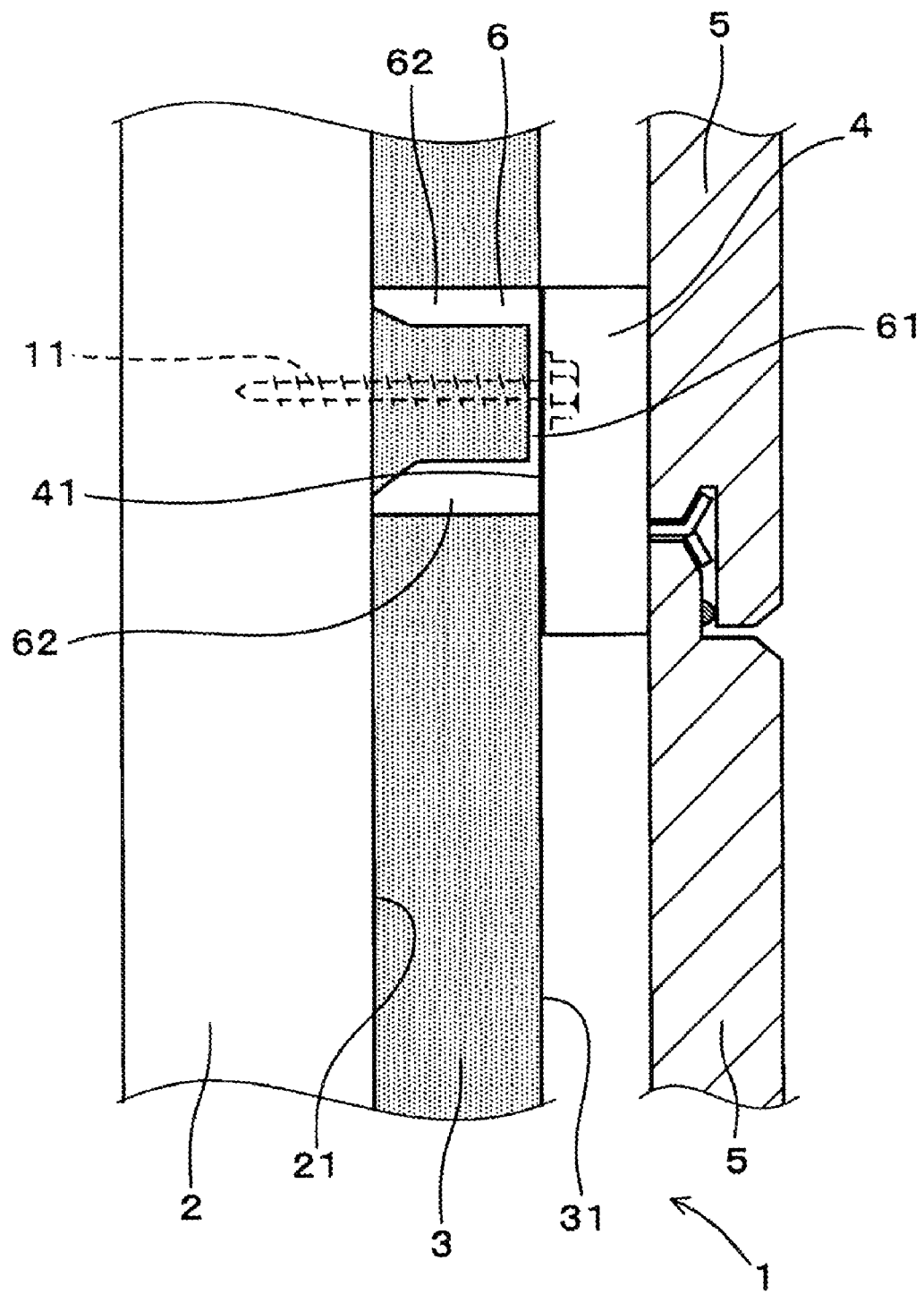
FIG. 13 is vertical sectional view of a conventional external wall constructing structure.

Embodiments of the present invention are set forth in the following description with reference to the appended FIGS. 1-11. FIG. 1, FIG. 2 and FIGS. 5-11 show examples of backing metal fixtures of the present invention. FIG. 3 shows an external wall constructing structure using the backing metal fixture of the present invention. FIG. 4 shows a securing metal fitting used for the external wall constructing structure. In this specification, "front" denotes "outer side of building", "rear" denotes "inner side of building". In connection with a backing metal fixture or a securing metal fitting, "front", "rear", "up/upper/top", "down/lower/bottom", "horizontal" or "vertical" are used in the situation where the fixture and/or the fitting are being fixed to a skeleton. As for "left" and "right", left/right denotes "on the observer's left/right who is facing the outer side of an external wall."

[EXAMPLE 1]

Figure 1A:
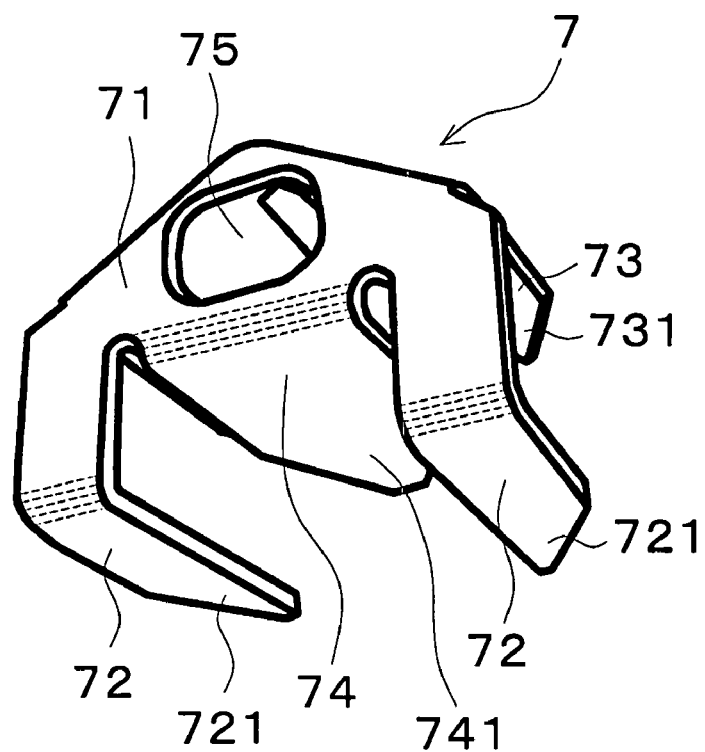
FIG. 1(*a*) and FIG. 1(*b*) are perspective views of a backing metal fixture of example 1.
Figure 1B:
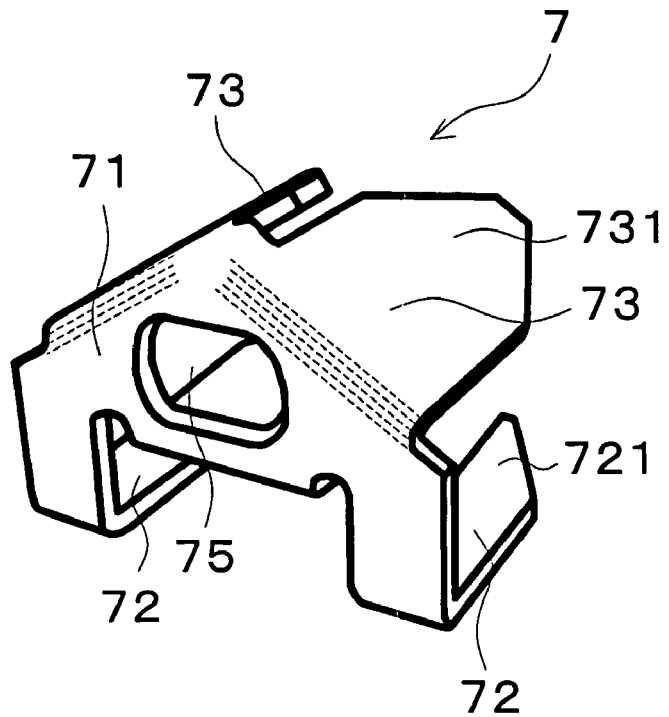

As shown in FIG. 1, a backing metal fixture 7 of example 1 of the present invention comprises a butting flat plate portion 71, legs 72, 72 of a first leg unit erected rearward from the butting flat plate portion 71, legs 73, 73, 74 of a reinforcing second leg unit and an opening. The butting flat plate portion 71 has an opening 75 to allow a screw 11 (described later) to go through, and three legs 73, 73, 74 of the reinforcing second leg unit stand respectively at three points near the opening 75.

The backing metal fixture 7 is formed by cutting and bending a 1.2 mm thick steel plate. The opening 75 formed in the butting flat plate portion 71 has an oval shape and the size is sufficiently larger than a diameter of the screw 11.

Figure 14:
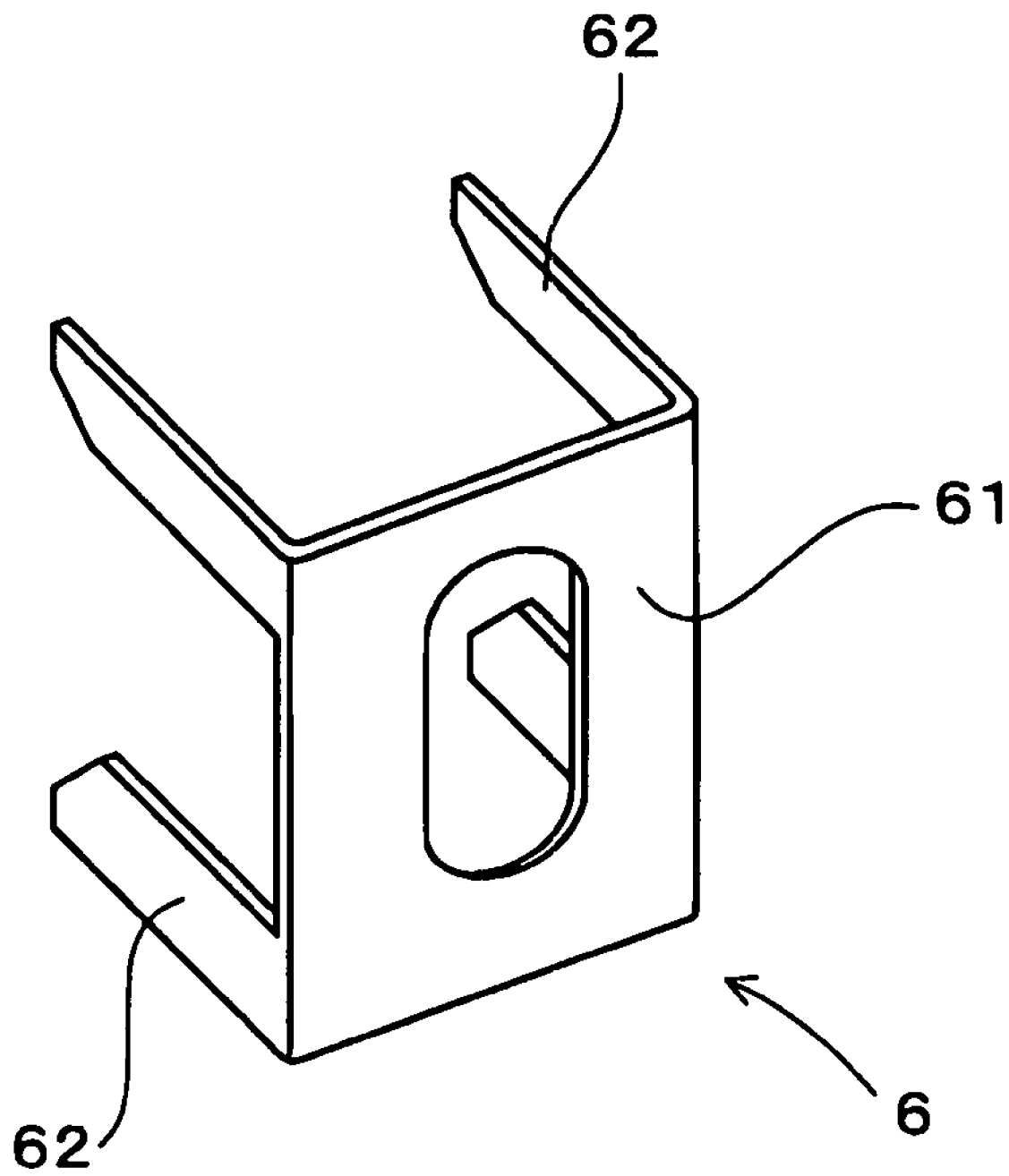
FIG. 14 is a perspective view of a conventional backing metal fixture.

Each of the legs 73, 73, 74 of second leg unit is located near the oval opening 75. On the periphery of the opening 75, end distance and edge distance of more than thickness of the steel plate are kept, and the three legs 73, 73, 74 are bent and erected rearward so that the longitudinal direction of the three legs are parallel to each other. Comparing to the leg unit 62 of the conventional backing metal fixture shown in FIG. 14, the three legs 73, 73, 74 of the second leg unit can sufficiently bear the pressure caused by the screw by having the three legs close to the opening 75 formed in the butting flat plate portion 71, which makes it possible to prevent the three legs 73, 73, 74 and the butting flat plate portion 71, and further legs 72, 72, from having a deformation.

Two legs 73, 73 of the second leg unit have a common bridging portion between them at the region near the butting flat plate portion 71. The front surface of the butting flat plate portion is formed so that an extension line of an edge line along which two surfaces of legs 73, 73 meet in the common bridging portion is orthogonal to a front surface of the butting flat plate portion.

By having such configuration, the strength of the two legs of 73, 73 of the second leg unit and the butting flat plate portion 71 can be significantly improved.

Figure 2C:
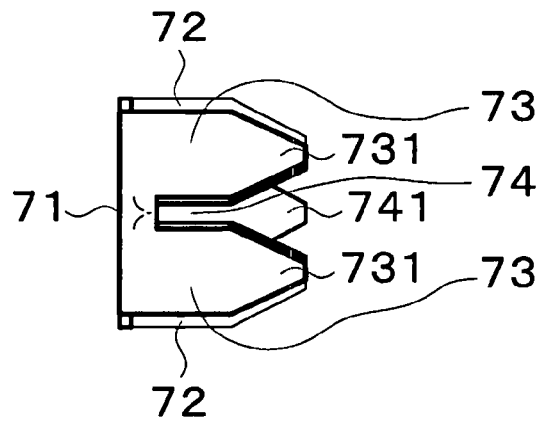
FIG. 2 shows a backing metal fixture of example 1 where FIG. 2(*a*), FIG. 2(*b*), FIG. 2(*c*), FIG. 2(*d*) and FIG. 2(*e*) show respectively a front view, a right side view, a top plan view, a bottom plan view and a rear view thereof.
Figure 2A:
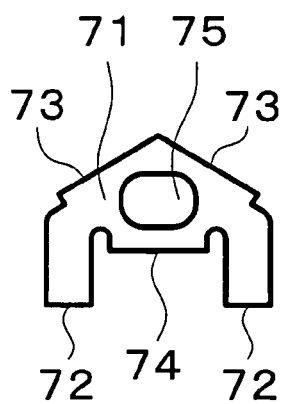
Figure 2B:
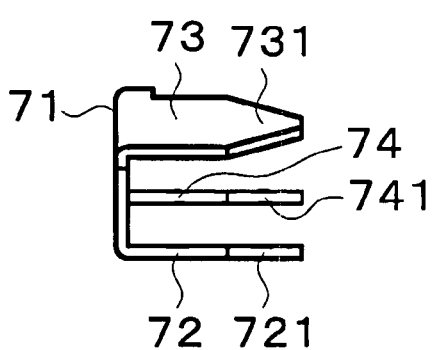
Figure 2E:
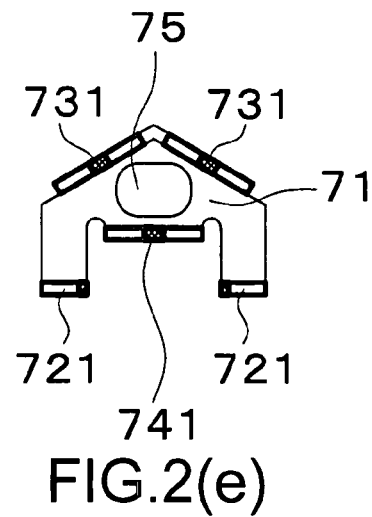
Figure 2D:
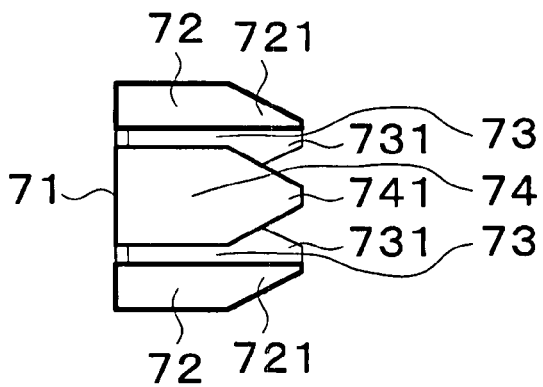

FIG. 2(a), FIG. 2(b), FIG. 2(c), FIG. 2(d) and FIG. 2(e) show respectively a front view, a right side view, a top plan view, a bottom plan view and a rear view of the backing metal fixture. As shown in FIG. 2(b), FIG. 2(c) and FIG. 2(d), all the legs 72, 72, 73, 73 and 74 are the same length. Further each of all the legs comprises a portion tapered in width toward each of the rear ends 721, 721, 731, 731 and 741. A leg with the tapered portion is preferable when it is used for an external wall constructing structure (described later) in order to make it easy for the leg to be pressed into a heat insulating material 3 of plastic foam. However the tapered portion is not necessary if the heat insulating material is made of a soft material into which a leg without a tapered portion can be easily pressed. By having such a shape/configuration, the legs and the butting flat plate portion can be made stronger than those of a conventional backing metal fixture 6. As a result, a backing metal fixture 7, where the three legs 73, 73, 74 and the two legs 72, 72, further butting flat plate portion 71 can hardly be deformed, can be obtained.

Further in this example, although all three legs 73, 73, 74 of the second leg unit are the same length as are each of the two legs 72, 72 of first leg unit, they are twice as wide in width as each of the two legs 72, 72 so that the legs 73, 73, 74 of the second leg unit can mainly receive the pressure caused by screw 11 at constructing. As a result, deformations of butting flat plate portion 71 and legs 72, 72 of the first leg unit can hardly be caused.

As shown in FIG. 3, an external wall constructing structure 1 of this example comprises, a skeleton 2, a heat insulating material 3 located on front surface 21 of the skeleton 2, a securing metal fitting 4 which is located on front surface 31 of the heat insulating material 3 and fixed to the skeleton 2 with screw 11, and an external wall panel 5 fixed to the skeleton 2 by the securing metal fitting 4.

A ventilating layer 12 is formed between the heat insulating material 3 and the external wall panel 5. A backing metal fixture 7 against which a rear surface 41 of the securing metal fitting 4 is butted is disposed on the heat insulating material 3.

The backing metal fixture 7 is disposed to the heat insulating material 3 by pressing legs 72, 72 of the first leg unit and legs 73, 73, 74 of the second leg unit into the heat insulating material 3 so that the butting flat plate portion 71 and a front surface 31 of the insulating material 3 are almost aligned in the same plane.

The legs 72, 72 of the first leg unit and legs 73, 73, 74 of the second unit are butted against a front surface 21 of the skeleton. In other words the length of all the legs is almost equal to the thickness of the heat insulating material 3. By this configuration, each of the rear ends 721, 721 of legs 72, 72 of the first leg unit and each of the rear ends 731, 731, 741 of legs 73, 73, 74 of the second leg unit are butted against the front surface 21 of the skeleton 2 while a front surface 711 of the butting flat plate portion 71 and a front surface 31 of the insulating material 3 are almost aligned in the same plane. Also, the rear ends 721, 721 of legs 72, 72 of the first leg unit and the rear ends 731, 731, 741 of legs 73, 73, 74 of the second leg unit can be run into the skeleton 2. For example, when the skeleton 2 has a plywood placed on the front surface of steel framework (described later), the rear ends 721, 721, 731, 731, 741 can be run into the plywood by about 1-3 mm.

In this example, the heat insulating material 3 is made of polystyrene foam heat insulation plate. The skeleton 2 is a steel framework made of shape steel. The skeleton 2 can also be a wooden framework structure or a wooden skeleton framing structure. A plywood and a waterproof sheet may be placed in this order on the steel framework of skeleton 2.

A width of the ventilating layer is preferably 12 mm or more. The outline of the butting flat plate portion 71 of the backing metal fixture 7 is smaller than that of a rear surface 41 of the securing metal fitting 4. When the securing metal fitting 4 is set on the butting flat plate portion 71, a front surface 711 of the butting flat plate portion 71 is covered with the rear surface 41 of the securing metal fitting 4.

As shown in FIG. 4, a securing metal fitting 4 for securing an external wall panel 5 comprises a base plate portion 410 with a flat rear surface 41, a supporting portion 42 erected frontward from the base plate portion 410, an upper panel engaging portion 43 extending obliquely upward from the supporting portion 42, and an lower panel engaging portion 44 extending obliquely downward from the supporting portion 42. Spacer portions 45, 45 for making a ventilating layer 12 are formed at both ends of the base plate portion. Each spacer portion 45 has a front flat surface portion 451 positioned between the base plate portion 410 and front end of the supporting portion 42. The front flat surface portion 451 is to be butted against a rear surface of the external wall panel 5. The base plate portion 410 has a plurality of openings 411 to allow a screw 11 to go through. Distance between the flat surface portion 451 of the spacer portion 45 and the rear surface 41 of the base plate portion 410, corresponding to a clearance of the ventilation layer 12, is 12 mm or more. The securing metal fitting 4 is formed by cutting and bending a steel sheet The external wall panel 5 is a ceramic type external wall panel with shiplap joint structure. That is, the external wall panel 5 has a lower tongue portion 51 formed at the top end portion of a panel and an upper tongue portion 52 formed at the bottom end portion of a panel. A lower end engaging portion 521 is formed behind the upper tongue portion 52. The lower tongue portion 51 of lower external wall panel 5 is engaged to the lower panel engaging portion 44 of the securing metal fitting 4. Also a lower end engaging portion 521 is engaged to the upper panel engaging portion 43 while being supported by the supporting portion 42 of the securing metal fitting 4. The securing metal fitting 4 is secured to the skeleton 2 by the screw 11 screwed into the skeleton 2 through the opening 411 and the heat insulating material 3. Thus the external wall panel 5 is secured to the skeleton 2 by the securing metal fitting 4.

More precisely, legs 72, 72 of the first leg unit of the backing metal fixture 7 are positioned so that the first leg unit and a top end part of the lower tongue portion 51 of lower external wall panel 5 at a shiplap joint region of upper and lower external wall panels are in roughly the same horizontal plane. By pressing the legs 72, 72 of the first leg unit and legs 73, 73, 74 of the second leg unit in the heat insulating material 3 so that the first legs 72, 72 and the top end of the lower tongue portion are aligned, the construction can be carried out without deviation in position. Then the securing metal fitting 4 is arranged so as to be engaged to the lower tongue portion 51 of the external wall panel 5 and secured to the skeleton 2 together with the backing metal fixture 7 by the screw 11. As a result, the external wall panel can be fixed to the skeleton 2 using the backing metal fixture 7, the securing metal fitting 4 and the screw 11.

A modified example 1 of FIGS. 5(*a*)-5(*e*) based on example 1 has a rib 76 in the leg 74 of the second leg unit. The rib 76 is for further reinforcement of the leg 74 located at the center area of the backing metal fixture 7, which results in a further improvement in the strength of backing metal fixture 7. This modified example 1 is the same as example 1 except that leg 74 has the rib.

In modified example 2 of FIGS. 6(*a*)-6(*e*) based on example 1, all the legs of the first and the second leg units, i.e., legs 72, 72, 73, 73, 74 have a rib 76 respectively. This modified example 2 can make the backing metal fixture 7 stronger than that of modified example 1. This modified example 2 is the same as example 1 except that all the legs have the rib and same effect as example 1 can be provided.

In modified example 3 of FIGS. 7(*a*)-7(*e*) based on example 1, all the legs 73, 73, 74 of the second leg unit have a rib 76 respectively and the first leg unit has four legs 72, 72, 72, 72. Since the pressure force caused by screwing can be mainly supported by the legs 73, 73, 74 of second leg unit and can be shared with the four legs 72, 72, 72, 72, the strength of backing metal fixture 7 can be improved more than that of modified example 2.

[EXAMPLE 2]

Example 2 of the present invention is shown in FIG. 8(*a*)-FIG. 8(*e*). This backing metal fixture 7 comprises a butting flat plate portion 71, legs 72, 72 of first leg unit erected rearward from the butting flat plate portion 71, a reinforcing tubular (roughly in the shape of hollow cylinder) leg 73 of a second leg unit, and an opening 75. The butting flat plate portion 71 has the opening to allow a screw 11 to go through and single reinforcing tubular leg 73 standing so that a wall of the tubular leg 73 closely surrounds the opening 75 inside. A rear end portion of the tubular leg 73 is formed of two tapered end portions 731, 731.

This backing metal fixture 7 is formed by cutting and bending 1.2 mm thick steel plate to form a butting flat plate portion 71 and other parts, and then joining a reinforcing tubular leg 73 of the second leg unit to a rear surface of the butting flat plate portion 71 to form an integrated fixture by press working, welding or brazing. The opening 75 formed in the butting flat plate portion 71 is circular and the diameter is sufficiently larger than a diameter of screw 11. Since in this example 2, the wall of single tubular leg 73 of the second leg unit closely surrounds the opening 75 and the tubular leg 73 is integrated with the butting flat plate portion 71, there are no other second unit legs such as legs 73, 73 as in example 1 which are formed by bending work.

The tubular leg 73 of the second leg unit is joined to a rear surface of the butting flat plate portion 71 so that a wall of the tubular leg 73 is located on a perimeter of the circle of the opening 75. Two cutout (notch-shape) portions 732, 732 are formed in the side of the tubular leg 73 in order to form two tapered end portions 731, 731 where a width of the curved surface is tapered toward the rear end. Compared to a backing metal fixture of a conventional example, the fixture 7 of this example can prevent deformations of the leg 73 of the second leg unit, the butting flat plate portion 71 and legs 72, 72 of the first leg unit because the tubular leg 73 of second leg unit is arranged so close to the opening 75 in the butting flat plate portion 71 that the tubular leg 73 of the second leg unit can more sufficiently bear the pressing force caused by the screw 11 when screwed. This example 2 is the same as example 1 except for the tubular leg 73 of second leg unit mentioned above.

In this example, because of the tubular shape of the reinforcing leg 73 integrated with the butting flat plate portion 71, the pressure force caused by screwing can be supported evenly by the circular shape cross section of the leg 73 of the second leg unit, which provides higher rigidity than example 1 and results in an increase in strength of the leg 73 of the second leg unit and the butting flat plate portion 71. Consequently, a backing metal fixture 7 where the leg 73 of the second leg unit, the butting flat plate portion 71 and legs 72, 72 of the first leg unit can hardly be deformed, and an external wall constructing structure where occurrence of an unevenness is to be avoided can be obtained. In addition, the same effects as example 1 can be provided.

In modified example 4 of FIGS. 9(*a*)-9(*e*) based on example 2, the tubular leg 73 of the second leg unit has a rib 76 to further increase the strength of leg 73 located at the center area of the backing metal fixture 7, which provides a stronger backing metal fixture 7 than that of example 2. In the same way, legs 72, 72 of the first leg unit have also a rib 76, 76 respectively to provide further a stronger backing metal fixture 7. This modified example 4 is the same as example 1 except for the tubular leg 73 and the ribs 76 on legs 73, 72 and 72, and the same effects as example 1 can be provided.

[EXAMPLE 3]

FIGS. 10(*a*)-10(*b*) show example 3 of the present invention. A backing metal fixture 7 comprises a butting flat plate portion 71, legs 72, 72 of the first leg unit erected rearward from the butting flat plate portion 71, legs 73, 73 of the reinforcing second leg unit and an opening. The butting flat plate portion 71 has an opening 75 to allow a screw 11 to go through, and two legs 73, 73 of the reinforcing second leg unit erected respectively from two positions near the opening 75.

The backing metal fixture 7 is prepared by cutting and bending a 1.2 mm thick steel plate to form a pair of legs 73, 73 of a reinforcing second leg unit each of which is made of curved plate to make a part of a hollow cylinder. The opening 75 formed in the butting flat plate portion 71 has a circular shape and the size is sufficiently larger than a diameter of the screw 11.

Legs 73, 73 of the second leg unit are arranged close to the circular opening 75. On the periphery of the opening 75, these legs 73, 73 of the second leg unit are bent and erected rearward at the location very close to the opening while end distance and edge distance equal to or more than thickness of the steel plate are kept. Comparing to the leg unit 62 of the conventional backing metal fixture 6, these legs 73, 73 of the second leg unit can sufficiently bear the pressure caused by the screw by having the legs 73, 73 located very close to the opening 75 formed in the butting flat plate portion 71, which makes it possible to prevent the legs 73, 73 and the butting flat plate portion 71, and further legs 72, 72, from having the deformation. This example is the same as example 1 except for the above mentioned changes.

In this example, two legs 73, 73 totally independent from each other, unlike the tubular leg 73 of the reinforcing second leg unit shown in example 2, which has a fully tubular leg portion of which one end is joined to the butting flat plate portion 71. Consequently material cost should be lower in this example than in example 2. Thus, a backing metal fixture 7 which is hard to be deformed in legs 72, 72 of the first leg unit, in legs 73, 73 of the second leg unit and in the butting flat plate portion 71, and an external wall constructing structure to avoid an occurrence of unevenness can be obtained while material cost is being reduced.

In modified example 5 of FIGS. 11(*a*)-11(*e*) based on example 3, a leg 73 of the second leg unit locating in the center area of the backing metal fixture 7 has a rib 76 to increase a strength of the leg 73, which leads to an increase in the strength of the fixture 7. Also legs 72, 72 have a rib to increase the strength of the legs 72, 72, which leads to a further increase in the strength of the fixture 7. This modified example 5 is the same as example 1 except for the above mentioned changes, and the same effects as example 1 can be provided.

A backing metal fixture can be made of any solid materials on the condition that the fixture can hardly be broken down or deformed when a pressure force (stress) is applied thereto and can hardly be deteriorated and/or decayed as it ages. In terms of strength and/or durability, however, there is preferable, for example, a fixture made by bending a metal plate made of iron, hot dip galvanized steel plate or stainless steel plate, or by joining those metal plates to be fixed. A thickness of the plate to form the fixture is preferably 1.2 mm or more in the case of metal plate such as iron plate so that the fixture can hardly be broken down or deformed when an external force is applied thereto.

As for heat insulating material, for example, polystyrene foam, glass wool and/or rock wool are available, and the ones specified in the following are preferable.

Japanese Industrial Standards JIS A 9504 "Man made mineral fibre thermal insulation materials"

Japanese Industrial Standards JIS A 9511 "Preformed cellular plastics thermal insulation materials"

Japanese Industrial Standards JIS A 9521 "Man made mineral wool thermal insulation materials for dwellings"

Japanese Industrial Standards JIS A 9526 "Spray-applied rigid polyurethane foam for thermal insulation."

A fixing member is not limited to a screw. A special nail or a fastener such as a post construction anchor can be used depending on the material of the skeleton. In the case of a steel skeleton, a self-drilling screw, available without hole-drilling in advance, is preferable.

What is claimed is:

1. A backing metal fixture used for fixing an external wall to a skeleton via a securing metal fitting and a heat insulating material placed on a front surface of the skeleton, comprising:

a butting flat plate portion adapted to be butted against a rear surface of the securing metal fitting having an opening in the center area to allow a fixing member to go through, and a first leg unit and a second leg unit erected rearward from the butting flat plate portion, wherein the second leg unit is erected from a position closer to the opening than the first leg unit, the second leg unit has three legs and each of the three legs is positioned so that each of the outer surfaces of the three legs is erected along one of three lines formed by two equal sides and a bottom side of an isosceles triangle, respectively, the butting flat plate portion has a right part and a left part, each of which extends from the bottom side of the isosceles triangle and locates away laterally from the leg of the second leg unit which is erected along the bottom side of the isosceles triangle and the first leg unit has two legs, the two legs are erected, respectively from the right and the left parts of the butting flat plate portion, and each of the two legs of the first leg unit is parallel to the leg of the second leg unit which is erected from the bottom side of the isosceles triangle.

2. The backing metal fixture according to claim 1, wherein the first leg unit and second leg unit have the same length and are tapered in width toward a free end thereof.

3. An external wall constructing structure where an external wall panel is fixed to a skeleton via a securing metal fitting and a heat insulating material placed on a front surface of the skeleton, comprising:

a backing metal fixture set in the heat insulating material against which a rear surface of the securing metal fitting is butted, wherein the backing metal fixture comprises:

a butting flat plate portion, adapted to be butted against the rear surface of the securing metal fitting, having an opening in a center area to allow a fixing member to go through, and a first leg unit and a second leg unit erected rearward from the butting flat plate portion, wherein the second leg unit is erected from a position closer to the opening than the first leg unit, the second leg unit has three legs and each of the three legs is positioned so that each of the outer surfaces of the three legs is erected along one of three lines formed by two equal sides and a bottom side of an isosceles triangle, respectively, the butting flat plate portion has a right part and a left part, each of which extends from the bottom side of the isosceles triangle and locates away laterally from the leg of the second leg unit which is erected along the bottom side of the isosceles triangle, and the first leg unit has two legs, the two legs are erected, respectively, from the right and the left parts of the butting flat plate portion, and each of the two legs of the first leg unit is parallel to the leg of the second leg unit which is erected from the bottom side of the isosceles triangle.

4. The external wall constructing structure according to claim 3, wherein the first leg unit and second leg unit have the same length and are tapered in width toward a free end thereof.

5. The external wall constructing structure according to claims 3 or 4, wherein the first leg unit is positioned so that the first leg unit and a top end part of a lower tongue portion of a lower external wall panel at a joint region of an upper external wall panel and the lower external wall panel are roughly in a same horizontal plane.

6. The external wall constructing structure according to claim 3, wherein the first leg unit is positioned so that the first leg unit and a top end part of a lower tongue portion of a lower external wall panel at a joint region of an upper external wall panel and the lower external wall panel are roughly in a same horizontal plane.

7. The external wall constructing structure according to claim 3, wherein the first leg unit is positioned so that the first leg unit and a top end part of a lower tongue portion of a lower external wall panel at a joint region of an upper external wall panel and the lower external wall panel are roughly in a same horizontal plane.

8. The backing metal fixture according to claim 1 or 3, wherein the three legs of the second leg unit are parallel to each other.

9. The backing metal fixture according to claim 1 or 3, wherein the width of each of the legs of the second leg unit is twice as wide as the width of each of the two legs of the first leg unit.

* * * * *